(12) United States Patent
Cha (10) Patent No.: US 8,676,174 B2
(45) Date of Patent: *Mar. 18, 2014

(54) EASY CALL FOR CONTENT

(71) Applicant: Steve Cha, Franklin Lakes, NJ (US)

(72) Inventor: Steve Cha, Franklin Lakes, NJ (US)

(73) Assignee: Steve Cha, Frnaklin Lakes, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/655,133

(22) Filed: Oct. 18, 2012

(65) Prior Publication Data

US 2013/0040622 A1      Feb. 14, 2013

Related U.S. Application Data

(63) Continuation of application No. 12/336,977, filed on Dec. 17, 2008, now Pat. No. 8,315,608.

(51) Int. Cl.
*H04W 40/00*     (2009.01)
*H04W 4/00*      (2009.01)

(52) U.S. Cl.
USPC .......... 455/414.1; 455/445; 455/466

(58) Field of Classification Search
USPC ....................................... 455/414.1
See application file for complete search history.

(56) References Cited

U.S. PATENT DOCUMENTS

| | | | | |
|---|---|---|---|---|
| 6,044,275 | A * | 3/2000 | Boltz et al. | 455/466 |
| 6,947,404 | B1 * | 9/2005 | Zalka | 370/338 |
| 7,797,529 | B2 * | 9/2010 | Jiang et al. | 713/151 |
| 2003/0003899 | A1 | 1/2003 | Tashiro et al. | |
| 2009/0017827 | A1 | 1/2009 | Perry et al. | |
| 2009/0253463 | A1 * | 10/2009 | Shin et al. | 455/563 |

* cited by examiner

*Primary Examiner* — Claire X Pappas
*Assistant Examiner* — Ngan Pham Lu
(74) *Attorney, Agent, or Firm* — Cha & Reiter, LLC (57) ABSTRACT

A method and apparatus for quickly and easily requesting content over a mobile device via a telephone network without requiring user entry of a number of pieces of information or having to forward through certain request screens and/or browse for content. The method includes verifying a mobile device based on an incoming telephone call to a particular destination telephone number; retrieving by a content server the specific content associated with the particular destination telephone number in which contact has been initiated by the mobile device; and providing the specific content to the mobile device requesting the content. Specific content includes but is not limited to broadcast data, satellite transmitted data, and cable network data provided during a telephone call, so that a mobile device can receive everything from television shows to news broadcasts and educational shows, etc. so long it is within range of a telephone network.

24 Claims, 4 Drawing Sheets

Speed Dials

1. Music, Rock-N-Roll
2. Music, Rap
3. CNN Headline News
4. Learn a Language
5. Scientific American
6. Consumer Reports
7. Comedy Channel
8. Major League Baseball 9. Cooking
10. How to ........
11. Religion
12. Hobby
13. Childcare
14. Cartoon

EASY CALL FOR CONTENT

CROSS REFERENCE TO RELATED APPLICATION

This application is a continuation of U.S. patent Ser. No. 12/336,977 filed on Dec. 17, 2008, the content of which are incorporated herein by reference.

BACKGROUND OF THE INVENTION

1. Field of the Invention

The present invention relates to content retrieval, particularly from portable devices. More particularly, the present invention relates to content retrieval via a wireless phone, PDA, or other mobile device.

2. Description of the Related Art

The ability to access content by a wireless device such as a mobile telephone, personal digital assistant (PDA) is not an easy task. Typically, if the content is internet based, one must typically (1) type in an address for a website of the content provider; (2) sign on to the content provider with a username and password; (3) browse through a series of screen to select the desired content; and (4) confirm the selected content, and either provide payment a la carte, or have an account or credit card number on file for monthly charges, which may or may not be flat charges or based on access. Even if the content is provided free of charge, there are still numerous steps to get to a desired content provider's internet based website address, and select content for downloading.

Even with advent of the I-Phone® and the Blackberry Storm® touchscreen smartphone, touch typing on a tiny keypad is still cumbersome and time consuming.

Accordingly, there is a long-felt need in the art for a more simple way to enjoy a desired media content without increasing the design complexity of the mobile device.

SUMMARY OF THE INVENTION

The present invention provides a system and method for using a mobile apparatus, such as a cellphone, PDA, etc., to quickly request content without requiring user entry of a number of pieces of information, such as, for example, a web address, a sign-on, password, and then having to forward through to certain request screens and/or browse for content.

In the current invention, the user calls for content. With the advent of speed-dials and pre-programmed dialing, a user can retrieve the latest news, entertainment or other content with the mere push of a button, without having to browse through a series of screens displayed on the mobile apparatus and without having to download the program first. Alternatively, a user can dial a number corresponding to a desired program to enjoy multimedia content that includes video and/or audio content. The present invention may be embodied as a standalone apparatus or can be part of a telephone device, personal digital assistant (PDA), cell phone, etc.

One advantage of the present invention is that the user of a mobile apparatus, for example, can enjoy at his/her leisure any program where a cell phone coverage is available. Thus, there is no need to carry a music player, such as a DVD player. The teachings of the present invention permit a person to enjoy educational or informative programs, or listen to music, by the use of a cell phone.

According to an exemplary aspect of the invention, the telephone number or any combination of numbers dialed would be a dedicated line to provide media content. For example, a certain area code and telephone number is dialed (or programmed into speed dialing) to request Cable News Network (CNN) from a content server, which would answer the call and provide downloaded content associated with the specific request. This content could be, for example, the current news show that is also being broadcast on the CNN television channel, or an archived show.

Alternatively, it is within the spirit and scope of the present invention that there can be different telephone numbers associated with different content, or even different identifying extensions or options, to retrieve different information, including but in no way limited to the financial news, and/or the sporting news, a particular show, or a movie, etc. The content server may also receive a text message from the mobile device with a pre-programmed symbol or request to receive the desired content.

According to another exemplary aspect of the present invention, there can be a predefined time that the content will be delivered to the mobile device, or conversely, the content will be delivered for as long as the user does not disconnect the incoming call or the until the program is completed.

According to still another exemplary aspect of the invention, a mobile user can receive the content in their cell phone in real time or can browse the program using a button in the cell phone to forward/rewind, repeat the play of content.

BRIEF DESCRIPTION OF THE DRAWINGS

The above-mentioned and other features, and advantages of the present invention will become more apparent from the following detailed description when taken in conjunction with the accompanying drawings, in which.

DETAILED DESCRIPTION

In the following description, for purposes of explanation rather than limitation, specific details are set forth such as the particular architecture, interfaces, techniques, etc., in order to provide a thorough understanding of the present invention by a person of ordinary skill in the art. However, it will be apparent to those skilled in the art that the method and apparatus to call for content according to the present invention may be practiced in other embodiments which depart from these exemplary embodiments, but are still within the spirit of the invention and the scope of the appended claims. Moreover, for the purpose of clarity, detailed descriptions of well-known devices, circuits, and methods may be omitted so as not to obscure the description of the present invention with unnecessary detail of such well-known devices, circuits and methods.

Figure 1:
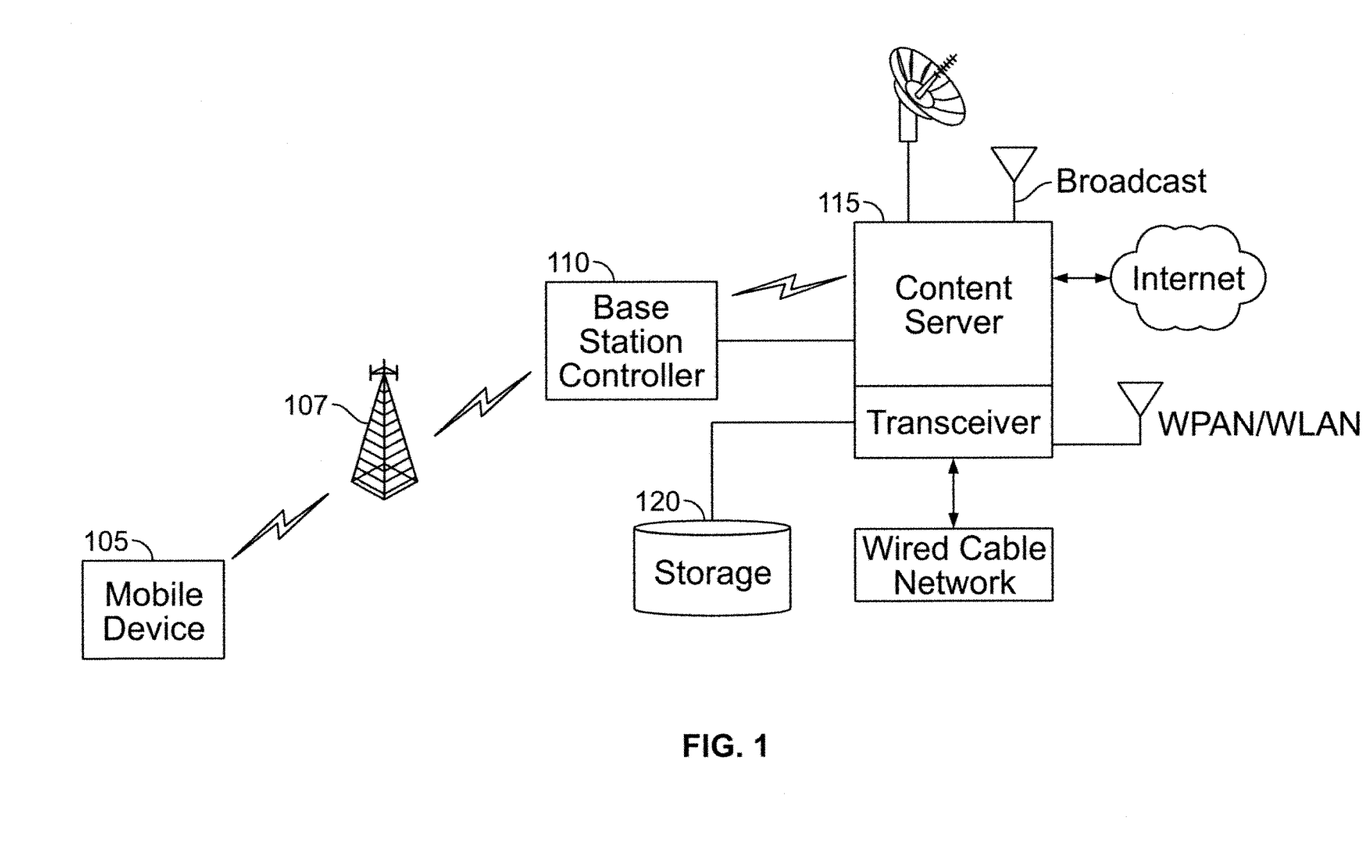
FIG. 1 illustrates a simplified block diagram of a system according to the present invention.

Referring now to FIG. 1, a first exemplary embodiment of a system in which the present invention operates may include a mobile device 105, a base station controller 110, and a content server 115. The mobile device 105 may operate wirelessly under any known communication protocol, such as, for example CDMA, GSM, TDMA, just to name a few possibilities. The mobile device 105 may also operate in any of the communication frequencies, including but in no way limited to, for example Wifi, 700 MHz range, 800 MHz range, 900 MHz, 1.8 GHz, etc (or any range therebetween or thereabove), just to name a few possible operating frequencies. In addition, the mobile device 115 may comprise a wireless telephone, personal digital assistant (PDA), handheld or notebook computer, etc.

The base station controller (BSC) 110 receives communications from the mobile device, typically but not limited to a tower 107, which may be connected wirelessly or wired (or both) to a content server 115.

The content server 115 either stores and/or retrieves content from a number of sources, including but not limited to Internet, satellite, broadcast, cable, WPAN/WLAN etc. The content server 115 may be wired or wirelessly (or even both) connected to the base station controller 110 and either stores or has links to documentary programs, educational, music, sports, a specific multimedia content. The content server also has podcasts of specific shows or channels, such as, for example, ESPN™, MSNBC™, HBO™, FOX Sports™, Bloomberg Financial™, just to name a few. The content server also preferably includes a transceiver, or is directly connected to a transceiver for receiving incoming telephone calls from, for example, a mobile device, and for receiving broadcast data, satellite data, wired cable network data, Internet data, and WPAN/WLAN data just to name a few possible sources.

In one exemplary aspect of the present invention, a respective telephone number for individual content is permitted. For example, an incoming call to area code 800-123-4567 will have the content server 115 provide CNN headline news. An incoming call to 800-123-4568 will provide CNN business news. Thus, a user can program the speed dial on their telephone for commonly accessed content, and with ease retrieve content on their mobile device. The number may be any combination of numbers that is specifically relates to a particular program. For efficiency, a set of fewer numbers can be dialed to receive video and/or audio program desired by a user.

In a preferred embodiment of the present invention, the content server can verify that the incoming caller is a bonafide subscriber by comparing the caller identification number (commonly referred to as "caller id") with a list of authorized telephone numbers. In this way, a mobile device can effortlessly require content. Note that content provide may provide free program via a specific number that a user dials in.

In addition to the aforementioned caller identification verification, the user would preferably be provided with a user id and/or password so that content can be accessed if a user happens to be using a different mobile device than authorized. It is also preferred that the user may initially provide multiple telephone numbers for authorized access.

According to an exemplary aspect of the invention, if the content server does not recognize the telephone number, a prompt may be provided to receive the user id and/or password for verification.

In still another exemplary aspect of the present invention, the user dials, presses a speed dial, or through a voice command via a protocol such as Bluetooth, and the mobile device dials a general number for retrieving content. After verification, the specific content can be identified by additionally keying in an option or extension number associated with the content. Moreover, the present invention also contemplates a browsing function, in which the content server, through a voice response unit (VRU) or additional prompts, can determine what programs are available and then make a selection.

Figure 2:
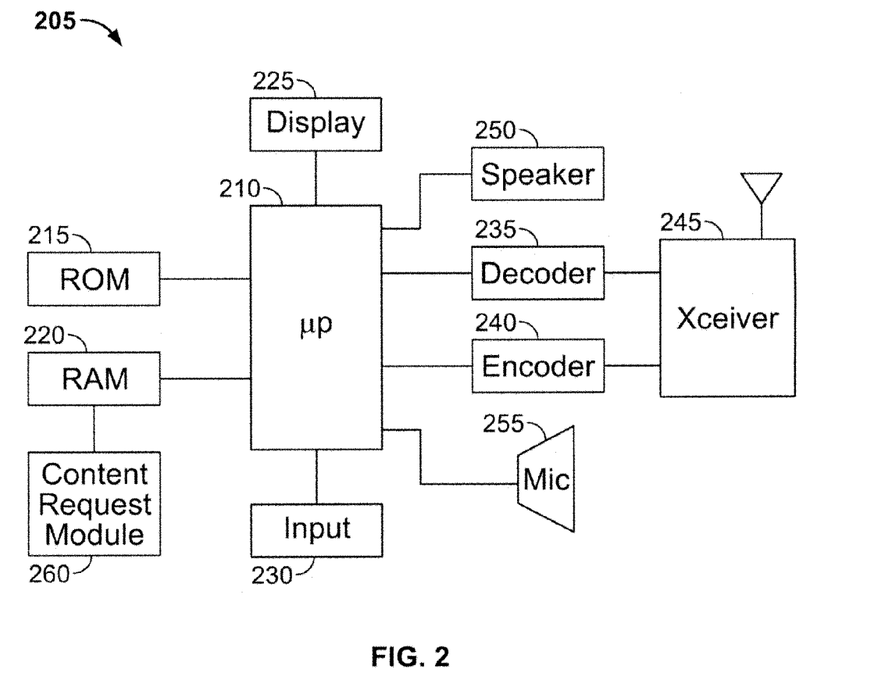
FIG. 2 illustrates an exemplary embodiment of a mobile device according to the present invention.

As shown in FIG. 2, according to another exemplary aspect of the present invention, a mobile device 205 according to the present invention may include a microprocessor 210, ROM 215, RAM 220, display 225, input module 230, decoder 235, encoder 240, transceiver 245, speaker 250, and microphone 255. In addition, a content request module 260 contains telephone numbers and/or text messages for requests content requests. In addition, the content request module 260 can receive a table of potentially requested material that is downloaded by the mobile device and periodically updated. In this way, the user does not have to bother with individually typing all the pre-programmed content telephone numbers or options that might be required to access the content.

The mobile device may or may not store the specific content for subsequent retrieval or replay. It is preferred that such a storage takes place, at least to the extent to permit the mobile device to replay/rewind/fast forward information that has been provided in a downloaded file.

Figure 3:
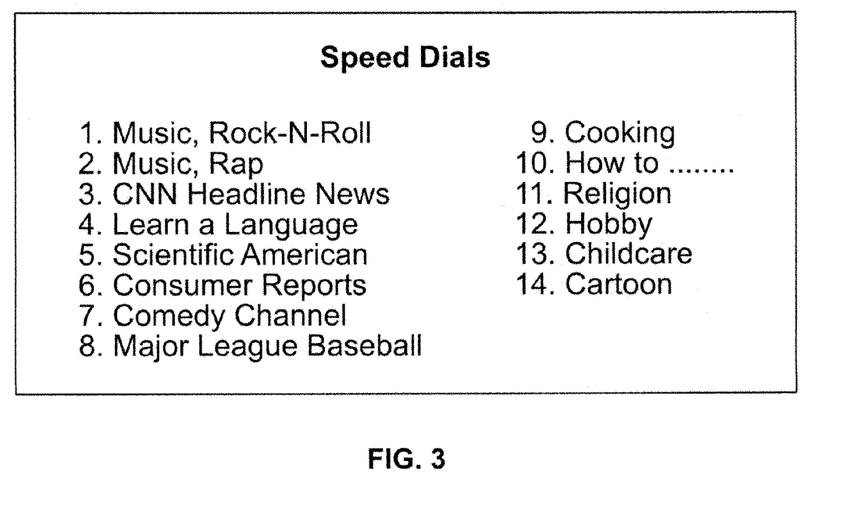
FIG. 3 is an illustration of a telephone speed dial display according to an exemplary embodiment of the present invention.

FIG. 3 shows a speed dial display of a mobile device according to an exemplary aspect of the invention. Both specific categories of content (e.g. CNN Headline News) and broader categories (Music, Rock-n-Roll, RAP) can be programmed to speed dials. In the case of music, the content retrieved can be from a rock-n-roll radio station. Alternatively, after completing the call, there can be prompts or additional options, such as "1" for The Rolling Stones, "2" for U2, and further sub-prompts, such as to request a particular album of the Rolling Stones or U2. Speed dial 4 in this example is for "learn a language", a representative educational program. Thus, just by the few examples shown, so long as a mobile apparatus is able to make a telephone call, rich content can be retrieved.

According to another exemplary aspect of the claimed invention, the incoming call that is made to retrieve content comprises a text message. The text message contains predetermined identifiable keywords used by the content server to determine the requested specific content.

In addition, to make such text message requests even easier to send, it is preferable that the content server, or another designated facility, includes an Internet accessible directory containing programmed sample text messages associated with requesting specific content for copying and/or downloading by the mobile device to request content. For example, programmed sample text messages can be used to form a template for requesting content via text message. In the case of a text message being sent to request content, the mobile apparatus would typically receive a return telephone call from the content server with the specific content after the content server receives the text message. It is preferred that the return call occur within a predetermined period of time, for example, within 30 seconds, one minute, etc. after the text message is sent.

It is also within the spirit and scope of the invention that the text message may contain instructions about the time to return the call with the content. For example, the text message may instruct the content server to call with the content in five minutes after receiving the text message, or at a specific time of day.

It should be appreciated by a person of ordinary skill in the art that while an exemplary content server 115 is shown in FIG. 1, it is within the spirit and scope of the claimed invention that one or more proxy servers may be used, not only for accessing content, but for verification purposes as well, with the caveats about proxy servers handling sensitive data. Also, functions of the content server as described herein can be provided by modules that are not physically part of a single unit but are in communication with each other.

Again, a person of ordinary skill in the art will appreciate that the content server 115 would typically contain one or more transceivers, or be in communication with one or more transceivers, for receiving broadcast, satellite, wired cable, WPAN/WLAN and Internet, just to name a few possible sources, and for communicating with the mobile devices.

One way the content server 115 may operate, for example, is by using software such as or similar to Replay AV™ that records and provides a streaming audio/video stream recorder. Other streaming video and audio (radio shows, online TV broadcasts, video clips, audio archives, podcasts) can be captured/accessed by the content server. The content provides the data to the base station controller that has been captured/recorded and converted to a format used by the mobile apparatus. Thus, a program such as Replay AV permits scheduling and converting streaming Video or Audio delivered to the mobile apparatus 105. Thus, the content server either accesses or stores in storage 250 (i.e. may access storage) recorded audio/video streaming from the Internet (like video clips and music), or audio/video from devices like TV Tuner cards, Webcams, Internet television stations, or radios that are attached to the content server. Replay AV™, or the like, for example, permits automatic conversion of captured media to formats such as MP3, iPod Video, iPod Audio, iPod bookmarkable Audiobook, AAC, WMA, WMV, AVI, MPEG, Sony PSP Video, WAV, OGG, 3GP, just to name a few possible non-limiting exemplary formats.

The mobile device may receive the data while still connected via the incoming call, or in some instances, may receive a call back from the content server after the content is retrieved, It should be understood by persons of ordinary skill in the art that the content server can operate by other ways than discussed herein above, so long as the mobile device can via a telephone call, preferably in stored in a speed dial memory, request and retrieve content by the use of a telephone network, preferably a wireless telephone network.

Figure 4:
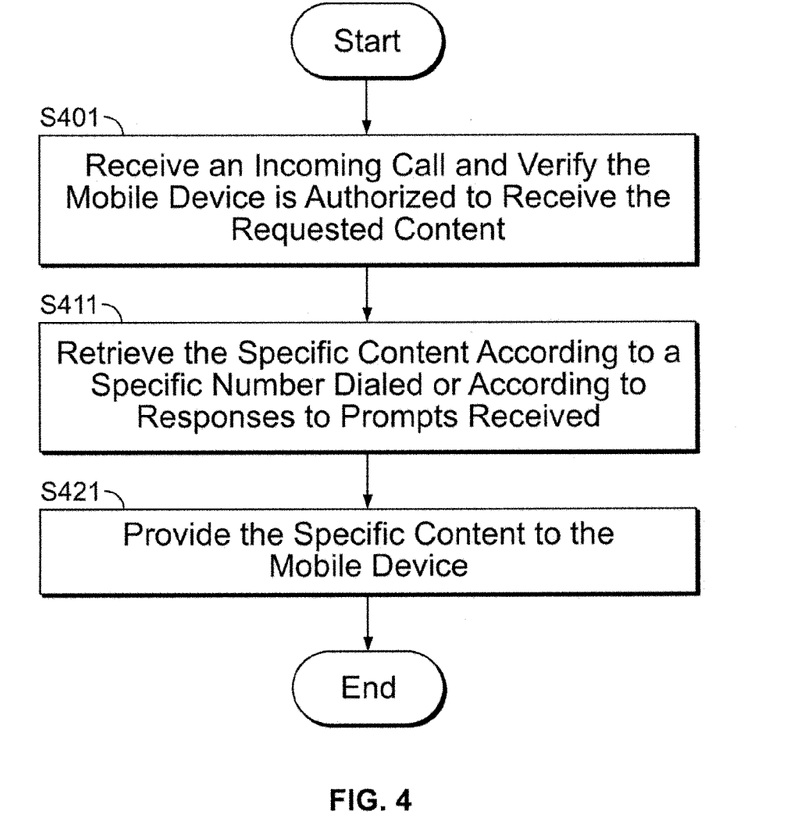
FIG. 4 is a flowchart of an exemplary method for operatively retrieving content according to an exemplary embodiment of the present invention.

FIG. 4 is a flowchart showing an exemplary operation according to the present invention.

At step 401, an incoming call is received by the content server, which may be a content server 115, such as shown in FIG. 1. The content server typically verifies that the mobile device is authorized to receive content. Note a user may simply dial a number to receive video and/or audio of a desired program from any content server. As such, verification in the context of this invention covers both the authorization verification and verification needed to establish a communication link.

According to the present invention, there are a number of various ways that verification may take place. For example, to facilitate the ease with which content can be obtained by a mobile device, the content server can verify the mobile device by reading the caller id information, which automatically provides the area code and telephone number of the mobile device. To further facilitate the ease with which content can be obtained, upon initial registration or subsequent update, the content server may be provided with a list of multiple telephone numbers for an authorized user. In this way, even if the user calls from his/her home phone, or another mobile telephone, the verification is straightforward.

However, verification may also include a user id and/or password, and this information may be required to update or add telephone numbers in the case where a user changes telephone numbers, etc. It is also within the spirit and the scope of the invention that a voice response unit can be used instead of the user having to key in an id and/or password, and this may be offered by the content server according to user preference.

At step 411, the content server retrieves specific content and provides it to the mobile device. It is preferred that initial incoming telephone call is maintained and the mobile device is provided the content as part of the same telephone call. However, it is within the spirit and scope of the invention that the caller may be called back within a predetermined of time with the content, and this content server may prompt for a delivery time of the content. In this way, a user of a mobile device may request that they receive a particular program, such as a comedy show, beginning five minutes from now. As previously discussed herein above, a text message can also be read by the content server to obtain the time the content is requested to be delivered.

According to the present invention, there are a various number of ways that content for retrieval can be identified. Firstly, specific telephone numbers can be associated with specific content. Thus, when the content server receives an incoming call, the incoming number dialed can be used to identify the content to be retrieved. For example, 800-123-1111 may be the number to call for ESPN, and 800-123-1112 may be the number for the Comedy Channel.

However, the user may also dial a general number and then be prompted for options. For example, option 1 could be ESPN, and option 2 could be the Comedy Channel. These options may also be dialed as extensions, and could be programmed into a user's speed dial along with the general number.

The content server is linked with a number of different sources, including but not limited to broadcast, satellite, cable, Internet, etc. The content server may store previous broadcast programs in a storage device 120, or may have links to other storage devices. In the case of broadcast, for example, the content server may receive the broadcast and convert it into a format that be sent to a mobile phone. As mentioned above in a non-limiting example, a recording of the broadcast by a program such as Replay AV™ that records and provides a streaming audio/video stream recorder, is one way that, for example, a television broadcast can be converted into a format that can be sent to a mobile telephone. Similar to one mobile device using GSM calling another mobile device using CDMA, the respective networks perform the specific protocol conversion if the content server utilizes a different format/carrier for telephone signals than the mobile device requesting the content.

Thus, the present invention provides an apparatus and method in which so long as a user is within a cell phone range, a mobile device can access content easily over their phone with a minimum of effort. If the mobile device utilizes Bluetooth technology or the like, it is possible that the speed dial could be voice activated, and the mere speaking of "Retrieve ESPN" or the like can activate the mobile device to contact the content server.

Although a preferred embodiment of the invention has been illustrated and described, it will be obvious to those having skill in this art that various other forms and embodiments now may be visualized readily without departing significantly from the spirit and scope of the invention disclosed herein and set forth in the accompanying claims. For example, the control logic means and the receiver could be a single unit, or two separate units, and the demodulation may include decoding in addition to or in lieu of demodulation.

In addition, the above-described methods according to the present invention can be realized in hardware or as software or computer code that can be stored in a medium such as a CD ROM, a RAM, a floppy disk, a hard disk, or a magneto-optical disk or downloaded over a network, so that the methods described herein can be rendered in such software using a general purpose microprocessor, general purpose computer, or a special processor or in programmable or dedicated hardware, such as an ASIC or FPGA. As would be understood in the art, the processor, the computer, the processor or the programmable hardware include memory components, e.g., RAM, ROM, Flash, etc. that may store or receive software or computer code that when accessed and executed by the computer, processor or hardware implement the processing methods described herein.

What is claimed is:

1. A method for providing easily retrieved content, comprising:
   (a) initiating a contact, via a mobile device, to a content server associated with a specific content to be transmitted over one or more of broadcast, satellite, wired cable, WPAN/WLAN and Internet protocols, the contact including a voice command indicating desired time when the specific content is to be delivered;
   (b) retrieving, by the content server, the specific content including video and/or audio content associated with the content server; and
   (c) providing the specific content to the mobile device initiating the contact in (a) at the desired time,
   wherein a table of potentially requested material is maintained for avoiding redundant request for the same content.

2. The method according to claim 1, further comprising verifying the mobile device by comparing a caller identification number against a list of authorized numbers.

3. The method according to claim 2, wherein the verification comprises receiving a password and comparing the password with an associated caller identification numbers.

4. The method according to claim 2, wherein the verification comprises comparing a user id and password against a list of authorized users.

5. The method according to claim 1, wherein a plurality of numbers is associated with a plurality of respective contents for selection by the mobile device.

6. The method according to claim 1, wherein the content server prompts the mobile device for content selection.

7. The method according to claim 1, wherein the voice command contains predetermined identifiable keywords used by the content server to determine the requested specific content.

8. The method according to claim 1, wherein the content server includes an Internet accessible directory containing programmed sample text messages associated with requesting specific content for copying and by the mobile device, and wherein said programmed sample text messages forming a template for requesting content via text message, and wherein the mobile apparatus receives a return call with the specific content after the content server receives the text message.

9. The method according to claim 1, wherein the specific content comprises one of broadcast data, satellite transmitted data, and cable network data provided to the mobile device.

10. The method according to claim 1, wherein the specific content comprises a podcast of a broadcast television program.

11. The method according to claim 10, where the podcast comprises a streamed version of a broadcast television program in one of Atom or Rich Site Summary (RSS) format.

12. The method according to claim 10, where the podcast comprises a file version of a broadcast television program in one of Atom or Rich Site Summary (RSS) format.

13. The method according to claim 1, wherein providing the specific content is provided to the mobile device by the content server.

14. A content server for providing content to a mobile device, comprising:
   a transceiver for receiving the content over one or more broadcast, satellite, wired cable, WPAN/WLAN and Internet protocols and for communicating with one or more mobile devices;
   means for receiving a contact from the mobile device to a content server requesting a specific content to be transmitted over the one or more of the broadcast, satellite, wired cable, WPAN/WLAN and Internet protocols, the contact including a voice command indicating desired time when the specific content is to be delivered;
   means for retrieving the specific content identified via the contact; and
   means for providing the specific content including video and/or audio content associated with the content server at the desired time,
   wherein a table of potentially requested material is maintained for avoiding redundant request for the same content.

15. The content server according to claim 14, where the means for initiating the contact include caller id detection and means for comparing the caller id with a list of authorized users.

16. The content server according to claim 14, wherein the content server includes means for prompting selection of the specific content for retrieval.

17. The system according to claim 14, wherein providing the specific content is provided to the mobile device by the content server.

18. A terminal for providing content, comprising:
   means for initiating a contact to a content server requesting a specific content to be transmitted over the one or more of the broadcast, satellite, wired cable, WPAN/WLAN and Internet protocols, the contact including a voice command indicating desired time when the specific content is to be delivered;
   means for receiving the specific content identified via the contact; and
   means for providing the specific content including video and/or audio content associated with the content server at the desired time,
   wherein a table of potentially requested material is maintained for avoiding redundant request for the same content.

19. The terminal according to claim 18, where the means for initiating the contact include caller id detection and means for comparing the caller id with a list of authorized users.

20. The terminal according to claim 18, wherein the verification comprises receiving a password and comparing the password with an associated caller identification numbers.

21. The terminal according to claim 18, wherein the voice command contains predetermined identifiable keywords used by the content server to determine the requested specific content.

22. A system for content retrieval by a mobile device, comprising
   a content server for retrieving a specific content in response to a contact from the mobile device, which includes a voice command indicating desired time when the specific content is to be delivered;
   one or more transceivers for receiving the specific content including video and/or audio content associated with the contact sent over one or more of broadcast, satellite, wired cable, WPAN/WLAN and Internet protocols, and means for converting broadcast data into a form suitable for transmission over a telephone network, wherein a table of potentially requested material is maintained for avoiding redundant request for the same content.

23. The system according to claim 22, wherein the specific content received over one or more of the broadcast, satellite, wired cable, WPAN/WLAN, and Internet protocols is recorded and stored in at least storage medium accessible by the content server for subsequent retrieval and transmission over the telephone network.

24. The system according to claim 22, wherein providing the specific content is provided to the mobile device by the content server.

* * * * *

UNITED STATES PATENT AND TRADEMARK OFFICE
CERTIFICATE OF CORRECTION

PATENT NO. : 8,676,174 B2
APPLICATION NO. : 13/655133
DATED : March 18, 2014
INVENTOR(S) : Steve Cha It is certified that error appears in the above-identified patent and that said Letters Patent is hereby corrected as shown below:

In the claims

Column 7, Claim 8, Line 51 should read as follows:
--...the mobile device receives...--

Column 8, Claim 17, Line 28 should read as follows:
--...The content server according...--

Column 8, Claim 18, Line 33 should read as follows:
--...transmitted over one or...--

Column 8, Claim 18, Line 34 should read as follows:
--...of broadcast, satellite, wired...--

Column 8, Claim 20, Line 49 should read as follows:
--...claim 19, wherein the...--

Signed and Sealed this
Fifth Day of April, 2016

Michelle K. Lee
*Director of the United States Patent and Trademark Office*